Patented Feb. 7, 1950

2,496,363

UNITED STATES PATENT OFFICE 2,496,363

PROCESS FOR PREPARING CERTAIN PANTOTHENIC ACID SALTS

Evelyn H. Wilson, Newark, and John Weijlard and Max Tishler, Westfield, N. J., assignors to Merck & Co., Inc., Rahway, N. J., a corporation of New Jersey No Drawing. Application August 27, 1948, Serial No. 46,548

16 Claims. (Cl. 260—534)

This invention relates to a new process for the preparation of pantothenic acid and its salts and, particularly, to a new and improved process for preparing d-calcium pantothenate.

Of the various alkali and alkaline earth metal salts of pantothenic acid which have been employed therapeutically, the most satisfactory preparation appears to be d-calcium pantothenate. Various procedures are known for preparing this compound, probably the most practical heretofore being the reaction of the calcium salt of $\beta$-alanine with l-pantoyl lactone, i. e. l-$\alpha$-hydroxy-$\beta$,$\beta$-dimethyl butyrolactone. While the process is a practical one, it does have chemical difficulties particularly from the point of view of purity of the product. Since calcium $\beta$-alaninate is a strong base, a part of it reacts with the lactone producing the calcium salt of $\alpha$,$\gamma$-dihydroxy-$\beta$,$\beta$-dimethylbutyric acid instead of calcium pantothenate. The separation of these two compounds from each other is difficult.

We have now discovered a new procedure for the preparation of calcium pantothenate which wholly avoids the difficulties above mentioned in employing the calcium salt of $\beta$-alanine as an essential reactant. Regarded in certain of its broader aspects the novel process according to the present invention comprises reacting substantially equimolecular amounts of l-$\alpha$-hydroxy-$\beta$,$\beta$-dimethyl butyrolactone and $\beta$-alanine in anhydrous alcohol with at least a molecular equivalent of a secondary or tertiary amine by heating to reflux at least until all of the reactants are in solution, thereafter distilling at least part of the alcohol to remove excess amine, dissolving at least a half-molecular equivalent of calcium oxide in the anhydrous alcohol solution of the reaction product, and crystallizing d-calcium pantothenate from the alcohol solution.

The presence of a secondary or tertiary amine is essential to the reaction. The lactone and $\beta$-alanine in alcohol alone do not react and, similarly, with primary amines the desired reaction does not occur. $\beta$-Alanine does not react with secondary or tertiary amines when the mixture in alcohol is refluxed 24 hours or longer as is evidenced by failure of the $\beta$-alanine to dissolve. Nor does the butyrolactone react with the amines under the conditions of our synthesis, since the optical rotation of these reagents in methanol does not change from the characteristic levo rotation of the lactone.

Surprisingly, when all three reagents in an alcohol are heated, reaction occurs within a short time. This fact is recognized by the dissolution of the $\beta$-alanine and a change of rotation of the solution from a high levo value (—25° to —35°) to a strongly positive value of +45°.

If less than one equivalent of the lactone or the amine is used, a corresponding quantity of $\beta$-alanine remains undissolved. Accordingly, for best results stoichiometric quantities of $\beta$-alanine should be employed and somewhat more than one equivalent of the less expensive amine is required particularly if the latter is highly volatile. When all the $\beta$-alanine has dissolved, the amine salt of pantothenic acid is in solution.

The reaction is preferably conducted in anhydrous methanol, although other anhydrous lower aliphatic alcohols can also be employed. A mixture of the lactone, $\beta$-alanine and the secondary or tertiary amine in anhydrous alcohol is heated to reflux until all of the solid is in solution, approximately 4 hours generally being required to obtain complete solution. It is preferable to continue heating to reflux for an additional period of about 4 hours in order to assure completion of the reaction. The solution is then preferably filtered through charcoal to remove any insoluble impurities and is then distilled to remove excess amine, together with at least a portion of the alcohol. The removal of the excess amine is not essential although from an economic point of view it is desirable. In addition, excess amine exerts a solubilizing action on the salts of pantothenic acid so that its removal assures a higher direct yield of product. This distillation can be conducted in either of two ways, i. e. by continuing distillation until an essentially dry residue is obtained, or by adding alcohol during distillation to replace that distilled, thereby retaining the reaction product in alcohol solution.

The alcoholic solution remaining after distillation or obtained by dissolving the solid residue in alcohol is then treated with calcium oxide by adding slightly more than a half molecular equivalent of finely divided calcium oxide to the stirred solution and continuing the stirring after the addition of the calcium oxide until substantially all of the calcium oxide is dissolved. During this procedure it is preferable to maintain a temperature ranging from room temperature to about 35° C., the slightly elevated temperature being advantageous as it facilitates quicker and more complete dissolving of the calcium oxide. It is preferable to filter the solution promptly after dissolving the calcium oxide to remove any insoluble impurities since calcium pantothenate may begin to separate shortly after all of the oxide has dissolved. The separation of calcium pantothenate can be accelerated by seeding the filtered solution with a small amount of calcium pantothenate. Maximum separation of calcium pantothenate requires permitting the solution to stand for an extended period, i. e., 2 to 5 days, at room temperature, but this time can be materially reduced by cooling the mixture to about 0° C. and stirring during the crystallization period.

The sodium salt of pantothenic acid can also be prepared advantageously by the process of our invention by following the procedure above described up to the point of removal of excess amine and then adding to the residue thus obtained a sodium alcoholate, i. e. a solution of sodium in an anhydrous alcohol such as methanol, ethanol or isopropanol. The resulting solution is seeded with crystals of sodium pantothenate and stirred preferably at room temperature for an extended period of time to crystallize the sodium d-pantothenate. Yields of the order of 75% are readily obtained as a first crop crystals, and additional amounts of sodium d-pantothenate can be recovered from the mother liquors.

Many secondary and tertiary amines can be employed in our improved procedure. Thus, for example, secondary amines which can be employed include aliphatic amines such as dimethyl-, diethyl-, dipropyl-, and dibutyl amines, morpholine, diethanolamine, diisopropanolamine, and heterocyclic and aromatic amines such as piperidine, its methylated and ethylated derivatives (hexahydrolutidine), hydrogenated quinolines and isoquinolines, ditolylamine, N-phenylethylamine, pyrrolidine (tetrahydropyrrole) and pyrroline (dihydropyrrole). Tertiary amines which can be employed include aliphatic amines such as trimethyl-, triethyl-, tripropyl-, tributyl amine, heterocyclic and aromatic amines such as N-ethyl or N-methyl piperidine, quinoline, isoquinoline and their methylated derivatives, dimethyl-, diethyl-, and dibutyl aniline, and dimethyl toluidine.

The following examples show how the process of the present invention can be carried out, but it is to be understood that these examples are given by way of illustration and not of limitation.

*Example 1*

A mixture of 26 gm. 1-pantoyl lactone (0.2 m.), 18 gm. β-alanine (0.2 m.), 50 cc. absolute methanol and 25 cc. diethylamine (0.24 m.) was refluxed till all the β-alanine was in solution (about 8 hours) and then for 4 hours more. The solution is diluted with 100 cc. absolute methanol and filtered through a pad of norit. The almost colorless filtrate has a rotation of $+46.9°$ indicating completion of reaction. This solution was distilled to remove excess diethylamine. During the distillation methanol was added dropwise to maintain the volume at 175 cc. Calcium oxide (6.2 gm., 0.15 m.) was added to the stirred solution. Slow stirring continued till all the calcium oxide was in solution (about 3 hours). The solution was filtered from a small amount of brown material, and the filtrate was seeded with calcium pantothenate. The white granular product (calcium pantothenate) was filtered after 2 days. The product weighed 40 gm. (84% yield) and had a rotation of $+27°$ in water.

*Example 2*

52 gm. 1-pantoyl lactone (0.4 mole) and 36 gm. β-alanine (0.4 mole) were placed in a 1 liter-3-neck flask equipped with a mechanical stirrer, thermometer and an efficient reflux condenser, 300 cc. absolute methanol was added followed by 26 gm. anhydrous dimethylamine (about 0.6 mole). Since the dimethylamine boils at 7° C., it was added under the surface of methanol through a delivery tube while stirring mechanically. The mixture was refluxed while stirring for 8 hours (after 4 hours stirring and boiling all the solid had gone in solution).

The excess dimethylamine and the methanol were distilled off at atmospheric pressure until the internal temperature reached 85° C., the residue was held at 85–90° C. for 30 minutes, then dissolved in 300 cc. absolute methanol and cooled to 30° C. About 12.5 gm. (0.22 mole) powdered calcium oxide (reagent or N. F.) was added, the mixture was stirred mechanically at 30–35° C. until most of the lime had dissolved (2 to 4 hours), 2 gm. norit was added, the solid was filtered off and washed with $3 \times 10$ cc. methanol. The clear solution was seeded with calcium pantothenate and in a few hours a solid mass was produced. The mass was allowed to stand 48 hours at room temperature, then 24 hours at 0° C. The solid was broken up, sucked as dry as possible on a Buchner, washed with $5 \times 30$ cc. ice-cold methanol, then slurried up with ether, sucked dry and dried in vacuo to constant weight. Yield 80.0 gm. calcium pantothenate=84.2% of theory; $[\alpha]_D = +25.7°$. Calcd. for $C_{18}H_{32}O_{10}N_2Ca$: C, 45.35; H, 6.77; N, 5.88; Ca, 8.41. Found: C, 45.44; H, 6.97; N, 6.10; Ca, 8.24.

*Example 3*

52 gm. 1-pantoyl lactone (0.4 mole), 36 gm. β-alanine (0.4 mole), 100 cc. absolute methanol and 35 gm. anhydrous diethylamine (about 0.5 mole) were mixed and refluxed under vigorous stirring for 8 hours; the solution was complete after 4 hours stirring and boiling.

For the sake of convenience the reaction mixture was allowed to stand overnight at room temperature, then the excess diethylamine and the methanol were distilled off at atmospheric pressure until the internal temperature reached 85° C.; the residue was held at 85–90° C. for 30 minutes, then dissolved in 300 cc. methanol and converted to calcium pantothenate exactly as described under Example 2. Yield 78.5 gm. (82.6% of theory); $[\alpha]_D = +26.0°$. Calcd. for $C_{18}H_{32}O_{10}N_2Ca$: N, 5.88; Ca, 8.41. Found: N, 5.84; Ca, 8.22.

*Example 4*

17.8 gm. β-alanine, 26 gm. 1-pantoyl lactone, 35 cc. triethylamine, and 50 cc. absolute methanol were refluxed 72 hours. The β-alanine that had not reacted was filtered and to the filtrate was added 100 cc. absolute ethanol. The solution was distilled until about 1500 cc. distillate had been collected. During the distillation the volume is maintained at 175 cc. by the addition of more ethanol. The reaction solution was cooled to room temperature and 4.1 gm. calcium oxide was added. The mixture was stirred until all the calcium oxide had dissolved. The solution was filtered through a pad of norit, and the colorless filtrate was seeded with calcium pantothenate. The mixture remained at room temperature for 72 hours. Calcium pantothenate was filtered and dried. Yield: 46%. Wt.=21.8 gm.; $[\alpha]_D = +22°$ (1%).

Example 5

A reaction mixture is prepared as in Example 2, distilling off the excess dimethylamine and the methanol and holding the residue at 85-90° for 30 minutes. To this residue is added a solution of 9.2 gm. sodium (0.4 at.) in 600 cc. anhydrous isopropanol, and the resulting clear solution is seeded, then stirred at room temperature. The product first separates in a somewhat gelatinous condition and changes to a crystalline form on further stirring. After 48 hours continuous stirring the sodium d-pantothenate is separated, washed with isopropanol and dried. Yield about 75%.

Example 6

A reaction mixture is prepared as in Example 3, distilling off the excess diethylamine and the methanol and holding the residue at 85-90° for 30 minutes. To this residue is added a solution of 9.2 gm. sodium (0.4 at.) in anhydrous ethanol. The solution is seeded with crystals of sodium d-pantothenate and stirred to crystallize out sodium d-pantothenate which is separated, washed with isopropanol, and dried as described in Example 5.

Various changes and modifications in the foregoing procedures will occur to those versed in the art, and to the extent that such changes and modifications fall within the purview of the appended claims, it is to be understood that they constitute part of our invention.

We claim:

1. The process that comprises reacting substantially equi-molecular amounts of l-α-hydroxy-β,β-dimethyl butyrolactone and β-alanine in an anhydrous lower aliphatic alcohol with at least a molecular equivalent of a substance selected from the group consisting of secondary and tertiary amines, adding to the alcoholic reaction mixture a stoichiometrically equivalent amount of a substance selected from the class consisting of calcium oxide and sodium alcoholates and allowing the solution thus obtained to stand for crystallization of the corresponding metal salt of d-pantothenic acid.

2. The process that comprises reacting substantially equi-molecular amounts of l-α-hydroxy-β,β-dimethyl butyrolactone and β-alanine in an anhydrous lower aliphatic alcohol with at least a molecular equivalent of a substance selected from the group consisting of secondary and tertiary amines, removing excess amine from the reaction mixture by distilling the same together with part of the alcohol, adding to the residual alcoholic solution a stoichiometrically equivalent amount of a substance selected from the class consisting of calcium oxide and sodium alcoholates and allowing the solution thus obtained to stand for crystallization of the corresponding metal salt of d-pantothenic acid.

3. The process for preparing d-calcium pantothenate that comprises reacting substantially equi-molecular amounts of l-α-hydroxy-β, β-dimethyl butyrolactone and β-alanine in anhydrous lower aliphatic alcohol with at least a molecular equivalent of a substance selected from the group consisting of secondary and tertiary amines, adding to the alcoholic reaction mixture thus obtained at least a half molecular equivalent of calcium oxide, and allowing the solution thus obtained to stand for crystallization of d-calcium pantothenate therefrom.

4. The process for preparing d-calcium pantothenate that comprises reacting substantially equi-molecular amounts of l-α-hydroxy-β,β-dimethyl butyrolactone and β-alanine in anhydrous lower aliphatic alcohol with at least a molecular equivalent of a substance selected from the group consisting of secondary and tertiary amines, removing excess amine from the reaction mixture by distilling the same together with at least part of the alcohol, adding to the residual alcoholic solution at least a half molecular equivalent of calcium oxide, and allowing the solution thus obtained to stand for crystallization of d-calcium pantothenate therefrom.

5. The process for preparing d-calcium pantothenate that comprises reacting substantially equi-molecular amounts of l-α-hydroxy-β,β-dimethyl butyrolactone and β-alanine in anhydrous lower aliphatic alcohol with at least a molecular equivalent of dimethylamine, removing excess amine from the reaction mixture by distilling the same together with at least part of the alcohol, adding to the residual alcoholic solution at least a half molecular equivalent of calcium oxide, and allowing the solution thus obtained to stand for precipitation of d-calcium pantothenate therefrom.

6. The process for preparing d-calcium pantothenate that comprises reacting substantially equi-molecular amounts of l-α-hydroxy-β,β-dimethyl butyrolactone and β-alanine in anhydrous lower aliphatic alcohol with at least a molecular equivalent of diethylamine, removing excess amine from the reaction mixture by distilling the same together with at least part of the alcohol, adding to the residual alcoholic solution at least a half molecular equivalent of calcium oxide, and allowing the solution thus obtained to stand for precipitation of d-calcium pantothenate therefrom.

7. The process for preparing d-calcium pantothenate that comprises heating to reflux in anhydrous lower aliphatic alcohol substantially equi-molecular amounts of l-α-hydroxy-β,β-dimethyl butyrolactone, β-alanine, and a substance selected from the group consisting of secondary and tertiary amines, continuing said heating to reflux at least until all of the reactants are in solution, thereafter distilling excess amine from the mixture together with at least part of the alcohol, dissolving in the alcohol solution thus obtained approximately a half molecular equivalent of calcium oxide, and permitting the solution to stand to precipitate d-calcium pantothenate therefrom.

8. The process for preparing d-calcium pantothenate that comprises heating to reflux in anhydrous methanol substantially equi-molecular amounts of l-α-hydroxy-β,β-dimethyl butyrolactone, β-alanine, and a substance selected from the group consisting of secondary and tertiary amines, continuing said heating to reflux at least until all of the reactants are in solution, thereafter distilling excess amine from the mixture together with at least part of the methanol, dissolving in the methanol solution thus obtained approximately a half molecular equivalent of calcium oxide, and permitting the solution to stand to precipitate d-calcium pantothenate therefrom.

9. The process for preparing d-calcium pantothenate that comprises heating to reflux in anhydrous methanol substantially equi-molecular amounts of l-α-hydroxy-β,β-dimethyl butyrolactone, β-alanine, and dimethylamine, continuing said heating to reflux at least until all of the reactants are in solution, thereafter distilling excess amine from the mixture together with at least part of the methanol, dissolving in the methanol solution thus obtained approximately a half molecular equivalent of calcium oxide, and permitting the solution to stand to precipitate d-calcium pantothenate therefrom.

10. The process for preparing d-calcium pantothenate that comprises heating to reflux in anhydrous methanol substantially equi-molecular amounts of l-α-hydroxy-β,β-dimethyl butyrolactone, β-alanine, and diethyl-amine, continuing said heating to reflux at least until all of the reactants are in solution, thereafter distilling excess amine from the mixture together with at least part of the methanol, dissolving in the methanol thus obtained approximately a half molecular equivalent of calcium oxide, and permitting the solution to stand to precipitate d-calcium pantothenate therefrom.

11. The process for preparing d-calcium pantothenate that comprises heating to reflux in anhydrous methanol substantially equi-molecular amounts of l-α-hydroxy-β,β-dimethyl butyrolactone, β-alanine, and a substance selected from the group consisting of secondary and tertiary amines, continuing said heating to reflux at least until all of the reactants are in solution, thereafter distilling excess amine and methanol from the solution while adding methanol to replace that distilled, dissolving in the methanol solution thus obtained approximately a half molecular equivalent of calcium oxide, and permitting the solution to stand to precipitate d-calcium pantothenate therefrom.

12. The process for preparing d-calcium pantothenate that comprises heating to reflux in anhydrous methanol substantially equi-molecular amounts of l-α-hydroxy-β,β-dimethyl butyrolactone, β-alanine, and a substance selected from the group consisting of secondary and tertiary amines, continuing said heating to reflux at least until all of the reactants are in solution, thereafter distilling methanol and excess amine from the reaction mixture at atmospheric pressure and at a temperature of about 85° C. until an essentially solid residue is obtained, redissolving the residue in methanol, dissolving in the methanol solution thus obtained approximately a half molecular equivalent of calcium oxide, and permitting the solution to stand to precipitate d-calcium pantothenate therefrom.

13. The process for preparing d-sodium pantothenate that comprises reacting substantially equi-molecular amounts of l-α-hydroxy-β,β-dimethyl butyrolactone and β-alanine in anhydrous alcohol with at least a molecular equivalent of a substance selected from the group consisting of secondary and tertiary amines, adding to the alcoholic reaction mixture thus obtained a stoichiometrically equivalent amount of a sodium alcoholate, and allowing the solution thus obtained to stand for crystallization of di-sodium pantothenate.

14. The process for preparing d-sodium pantothenate that comprises reacting substantially equi-molecular amounts of l-α-hydroxy-β,β-dimethyl butyrolactone and β-alanine in anhydrous alcohol with at least a molecular equivalent of a substance selected from the group consisting of secondary and tertiary amines, removing excess amine from the reaction mixture by distilling the same together with at least part of the alcohol, adding to the residual alcoholic solution a stoichiometrically equivalent amount of a sodium alcoholate, and allowing the solution thus obtained to stand for crystallization of d-sodium pantothenate.

15. The process for preparing d-sodium pantothenate that comprises reacting substantially equi-molecular amounts of l-α-hydroxy-β,β-dimethyl butyrolactone and β-alanine in anhydrous alcohol with at least a molecular equivalent of a substance selected from the group consisting of secondary and tertiary amines, removing excess amine from the reaction mixture by distilling the same together with at least part of the alcohol, adding to the residue thus obtained an alcoholic solution containing a stoichiometrically equivalent amount of sodium, and allowing the resulting solution to stand to crystllize d-sodium pantothenate.

16. The process for preparing d-sodium pantothenate that comprises reacting substantially equi-molecular amounts of l-α-hydroxy-β,β-dimethyl butyrolactone and β-alanine in anhydrous alcohol with at least a molecular equivalent of diethylamine, removing excess amine from the reaction mixture by distilling the same together with at least part of the alcohol, adding to the residue thus obtained an ethanol solution containing a stoichiometrically equivalent amount of sodium, and allowing the resulting solution to stand to crystallize d-sodium pantothenate.

EVELYN H. WILSON.
JOHN WEIJLARD.
MAX TISHLER.

REFERENCES CITED

The following references are of record in the file of this patent:

UNITED STATES PATENTS

| Number | Name | Date |
|---|---|---|
| 2,377,105 | Reichstein | May 29, 1945 |
| 2,390,499 | Carlson et al. | Dec. 11, 1945 |
| 2,442,143 | Pickel et al. | May 25, 1948 |

FOREIGN PATENTS

| Number | Country | Date |
|---|---|---|
| 552,036 | Great Britain | Mar. 19, 1943 |